United States Patent
Zabula et al.

(10) Patent No.: US 12,552,878 B2
(45) Date of Patent: Feb. 17, 2026

(54) RING OPENING METATHESIS CATALYST SYSTEMS FOR CYCLIC OLEFIN POLYMERIZATION

(71) Applicant: ExxonMobil Chemical Patents Inc., Baytown, TX (US)

(72) Inventors: Alexander V. Zabula, Seabrook, TX (US); Lubin Luo, Houston, TX (US); Robert L. Halbach, Baytown, TX (US); Jo Ann M. Canich, Houston, TX (US); Carlos R. Lopez-Barron, Houston, TX (US); Alan A. Galuska, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 428 days.

(21) Appl. No.: 17/906,249

(22) PCT Filed: Mar. 10, 2021

(86) PCT No.: PCT/US2021/021688
§ 371 (c)(1),
(2) Date: Sep. 13, 2022

(87) PCT Pub. No.: WO2021/188335
PCT Pub. Date: Sep. 23, 2021

(65) Prior Publication Data
US 2023/0159670 A1      May 25, 2023

Related U.S. Application Data

(60) Provisional application No. 62/992,002, filed on Mar. 19, 2020.

(51) Int. Cl.
*B01J 31/22*      (2006.01)
*C08F 4/639*      (2006.01)
*C08F 32/04*      (2006.01)

(52) U.S. Cl.
CPC .......... *C08F 4/63912* (2013.01); *C08F 32/04* (2013.01)

(58) Field of Classification Search
None
See application file for complete search history.

(56) References Cited

U.S. PATENT DOCUMENTS

| | | | |
|---|---|---|---|
| 3,598,796 A | 8/1971 | Nutzel et al. | 260/88.2 |
| 3,631,010 A | 12/1971 | Witte et al. | 260/82.1 |

(Continued)

FOREIGN PATENT DOCUMENTS

| | | | |
|---|---|---|---|
| CA | 1074949 | 4/1980 | C08F 2/02 |
| CN | 2018/8001293 | 10/2018 | G06F 16/9536 |

(Continued)

OTHER PUBLICATIONS

*Chem. Eng. News*, (1985), v.63, p. 27.
(Continued)

*Primary Examiner* — Catherine S Branch

(57) ABSTRACT

An improved catalyst for cyclic olefin polymerization. The catalyst includes a transition metal carbene having the following structure: $M^v(OR')_{c*m}X_{(v-c*m-2)}=C(R^*)_2$ wherein $M^v$ is a Group 5 transition metal having a valence (v) of 5 or a Group 6 transition metal having a valence (v) of 5 or 6; each R' is independently a monovalent organic moiety comprising from 8 to 40 atoms selected from Groups 14-17; c is an integer from 1 to 3; m is 1/3, 1/2, 1, 3/2, 2, 3, or 4 and $c*m \leq v-2$; X is a halogen; and each R* is independently H or a $C_1$ to $C_7$ alkyl. The catalyst is particularly useful for ring-opening metathesis polymerization (ROMP).

2 Claims, 4 Drawing Sheets

(56) References Cited

U.S. PATENT DOCUMENTS

| | | | |
|---|---|---|---|
| 3,707,520 A | 12/1972 | Pampus et al. | 260/33.6 |
| 3,778,420 A | 12/1973 | Brown et al. | 260/80.7 |
| 3,941,757 A | 3/1976 | Wakabayashi et al. | 260/80.78 |
| 4,002,815 A | 1/1977 | Minchak | 526/283 |
| 4,239,484 A | 12/1980 | Schuster | 432/77 |
| 4,654,462 A | 3/1987 | Basset et al. | 585/646 |
| 8,889,786 B2 | 11/2014 | Tsunogae et al. | 524/588 |
| 2016/0289352 A1 | 10/2016 | Blok et al. | C08F 132/08 |
| 2017/0247479 A1 | 8/2017 | Kuramoto et al. | C08F 4/14 |
| 2020/0094233 A1 | 3/2020 | Luo et al. | B01J 31/2213 |
| 2020/0094234 A1 | 3/2020 | Luo et al. | B01J 31/2213 |

FOREIGN PATENT DOCUMENTS

| | | | |
|---|---|---|---|
| JP | 2019/081839 | 5/2019 | C08K 3/04 |
| JP | 2019/081840 | 5/2019 | C08G 61/08 |
| WO | WO2018/173968 | 9/2018 | B60C 1/00 |

OTHER PUBLICATIONS

Dereli, O. et al. (2006) "The $WCl_6$-e—-Al-$CH_2Cl_2$ Catalyzed Polypentenamer Formation via Ring-Opening Metathesis Polymerization (ROMP)," *European Polymer Journal*, v.42, pp. 368-374.

Quignard, Francoise et al. (1986) "Aryloxide Ligands in Metathesis of Olefins and Olefinic Esters: Catalytic Behaviour of W(Oar),Cb Complexes Associated with Alkyl-tin or Alkyl-Lead Cocatalysts; Alkylation of W(Oar)&14 by $SnMe_4$, Sn(n-Bu)4, Pb(n-Bu)," *Jrnl. of Molecular Catalysts Synthesis of WC1*, pp. 13-29.

Rhers, B. et al. (2006) "Synthese et caracterisation de nouveaux complexes aryloxy a base de tungstene," *Comptes Rendus Chimie*, v.9(9), pp. 1169-1177.

Yao, Z. et al. (2012) "Ring-Opening Metathesis Copolymerization of Dicyclopentadiene and Cyclopentene Through Reaction Injection Molding Process," *J. of App. Poly. Sci.*, v.125(4), pp. 2489-2493.

RING OPENING METATHESIS CATALYST SYSTEMS FOR CYCLIC OLEFIN POLYMERIZATION

CROSS-REFERENCE TO RELATED APPLICATIONS

This application is a national stage filing of Patent Cooperation Treaty Application No. PCT/US2021/021688 filed Mar. 10, 2021, which claims the priority benefit of U.S. Provisional Application No. 62/992,002, filed Mar. 19, 2020, the disclosure of which is incorporated herein by reference.

BACKGROUND

The present disclosure relates to ring-opening metathesis catalysts and polymerization of cyclic olefins using same. In organic synthesis, a metathesis reaction is a catalytic reaction in which recombination of the double bonds occurs between two kinds of olefins or alkynes. Ring-opening metathesis polymerization (ROMP) involves the formation of unsaturated polymers from the ring opening of one, two, or more cyclic olefin comonomers. Generally, the cyclic olefin comonomers are strained cyclic olefins that react with a ROMP catalyst to open and relieve the strain, which produces linear molecules that react with other cyclic olefins. However, individual cyclic olefin comonomers have different degrees of strain and, therefore, have different reactivities with the ROMP catalyst. In some instances, said reactivities can be orders of magnitude different. Consequently, the incorporation of individual comonomers is different in the resultant polymer.

For example, U.S. Pat. Nos. 3,598,796, 3,631,010 and 3,778,420 describe the copolymerization of pre-mixed cyclopentene and dicyclopentadiene in various media before adding the ROMP catalyst. The resultant polymers are block copolymers or/and cross-linked copolymers.

The properties of the resultant polymer (e.g., mechanical properties, processability, and the like) depends, at least in part, on the relative amounts of each comonomer in the polymer. Accordingly, the ability to control the amount of each comonomer in the resultant polymer, including incorporation of the slower reacting comonomer at greater than 50 mol % of the polymer, would be advantageous.

One approach to incorporating more of the slower reacting comonomer is presented in U.S. Pat. Nos. 3,707,520 and 3,941,757 where two-stage copolymerization process was employed. In the first step, cyclopentene was homopolymerized before introducing a more reactive comonomer (second step). The resultant polymers were block copolymers, which has different properties than if the two comonomers where dispersed more homogenously throughout the polymer structure.

Accordingly, the ability to control the amount of each comonomer in the resultant polymer, including incorporation of the slower reacting comonomer at greater than 50 mol % of the polymer, throughout the polymer structure would be advantageous.

References of interest include US patent numbers: U.S. Pat. Nos. 3,598,796, 3,631,010, 3,707,520, 3,778,420, 3,941,757, 4,002,815, 4,239,484, 8,889,786; US patent publication numbers: US 2016/0289352, US 2017/0247479; Canadian patent number: CA 1,074,949; Chinese Pat. Pub. No. 2018/8001293; WO patent publication number WO 2018/173968, Japanese patent application publication numbers JP 2019/081839A and JP 2019/081840A, and Yao, Z. et al. (2012) "Ring-Opening Metathesis Copolymerization of Dicyclopentadiene and Cyclopentene Through Reaction Injection Molding Process," J. of App. Poly. Sci., v.125(4), pp. 2489-2493.

SUMMARY OF THE INVENTION

An improved catalyst for cyclic olefin polymerization is provided. The catalyst can include a transition metal carbene having the following structure: $M_v(OR')_{c*m}X_{(v-c*m-2)}=C(R*)_2$ wherein $M^v$ is a Group 5 transition metal having a valence (v) of 5 or a Group 6 transition metal having a valence (v) of 5 or 6; each R' is independently a monovalent organic moiety comprising from 8 to 40 atoms selected from Groups 14-17; c is an integer from 1 to 3; m is 1/3, 1/2, 1, 3/2, 2, 3, or 4 and $c*m \leq v-2$; X is a halogen; and each R* is independently H or a $C_1$ to $C_7$ alkyl. The catalyst is particularly useful for ring-opening metathesis polymerization (ROMP).

A catalyst for cyclic olefin polymerization that is a reaction product of at least one metal alkoxide having the formula: $m\ (R'O)_c M^u X_{(u-c)}$; and at least one transition metal halide having the formula: $M^v X_v$ is also provided. $M^u$ is a Group 1, 2, or 13 metal of valence u; and $M^v$ is a Group 5 transition metal having a valence v of 5 or a Group 6 transition metal having a valence v of 5 or 6. Each R' is independently a monovalent organic moiety comprising from 8 to 40 atoms selected from Groups 14-17. X is a halogen; c is an integer from 1 to 3; and m can be 1/3, 1/2, 3/2, 1, 2, 3, or 4 and $c*m \leq v-2$.

A process for cyclic olefin polymerization is also provided. The process can include: contacting a cyclic olefin polymerization catalyst with a $C_4$-$C_{20}$ cyclic olefin monomer comprising at least one cyclic olefin moiety in a polymerization reactor under conditions sufficient to form a reaction product mixture comprising a polymer, unreacted monomer, catalyst, and optionally a solvent; and recovering the polymer. The process can further include: separating the monomer from the reaction product mixture and recycling the monomer to the polymerization reactor; or contacting the recovered catalyst with an activator prior to recycling to the polymerization reactor; or a combination thereof.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
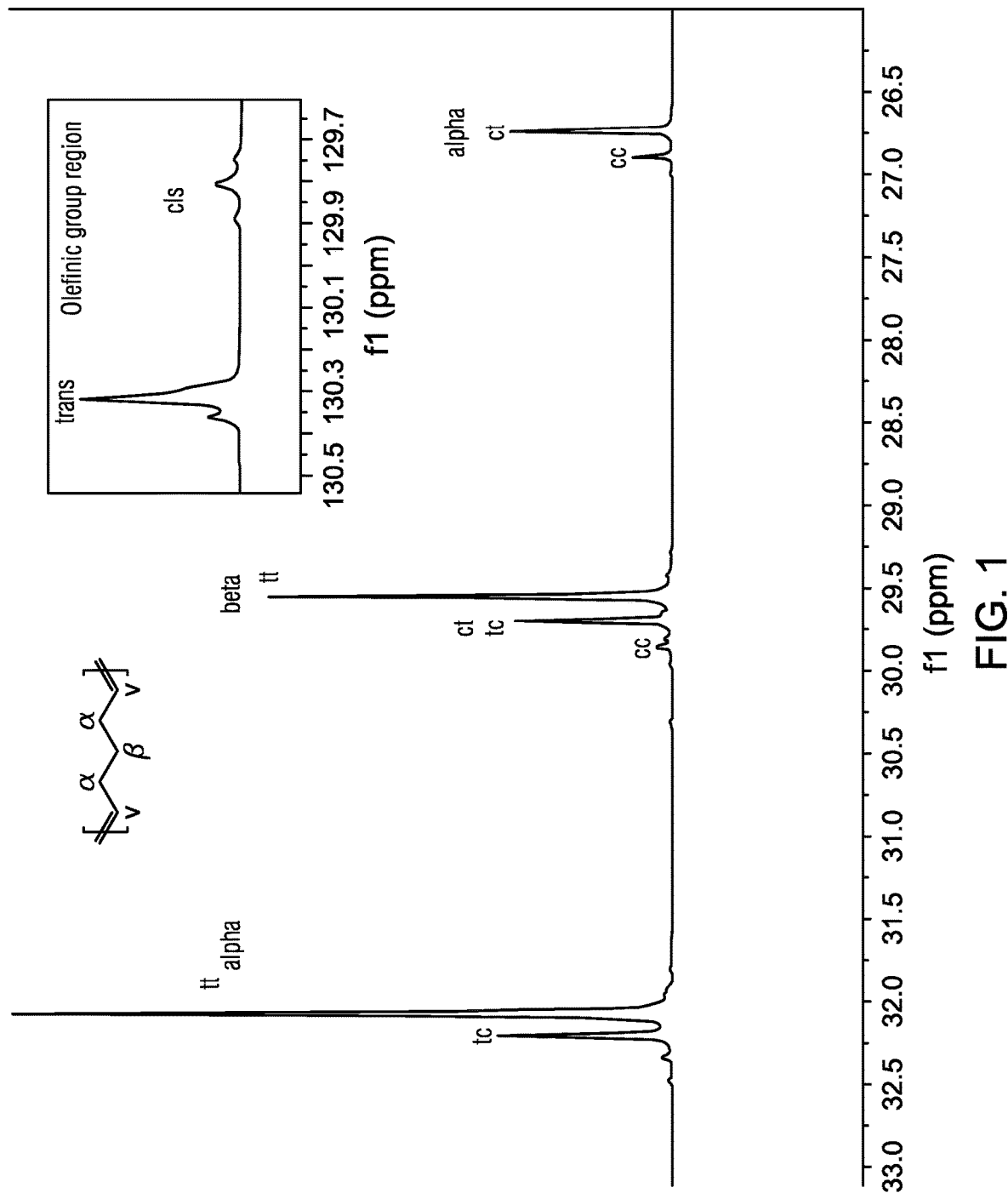
FIG. 1 is an exemplary $^{13}C$ NMR spectrum showing the chemical shift assignments of an illustrative cyclopentene polymer.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention.

Definitions and Test Methods

In the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. Thus, embodiments using "an antioxidant" include embodiments where one, two, or more antioxidants are used, unless specified to the contrary or the context clearly indicates that only one antioxidant is used.

The term "mass %" means percentage by mass such as percentage by weight, "vol %" means percentage by volume, "mol %" means percentage by mole, "ppm" means parts per million, and "ppm wt" and "wppm" are used interchangeably and mean parts per million on a weight basis. All concentrations herein, unless otherwise stated, are expressed on the basis of the total amount of the composition in question.

The terms "alkyl" and "alkyl group" are used interchangeably herein and refer to a saturated hydrocarbyl group consisting of carbon and hydrogen atoms. An alkyl group can be linear, branched, cyclic, or substituted cyclic.

The term "cycloalkyl" or "cycloalkyl group" interchangeably refers to a saturated hydrocarbyl group wherein the carbon atoms form one or more ring structures.

The term "aryl" or "aryl group" interchangeably refers to a hydrocarbyl group comprising an aromatic ring structure therein.

For the purposes of this disclosure and the claims thereto, the new numbering scheme for the Periodic Table Groups is used as in *Chem. Eng. News*, (1985), v.63, pg. 27. Therefore, a "Group 4 metal" is an element from Group 4 of the Periodic Table.

Unless otherwise indicated, a substituted group means such a group in which at least one atom is replaced by a different atom or a group. Thus, a substituted alkyl group can be an alkyl group in which at least one hydrogen atom is replaced by a hydrocarbyl group, a halogen, any other non-hydrogen group, and/or a least one carbon atom and hydrogen atoms bonded thereto is replaced by a different group. Preferably, a substituted group is a radical in which at least one hydrogen atom has been substituted with a heteroatom or heteroatom containing group, preferably with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

For purposes herein, "heteroatom" refers to non-metal or metalloid atoms from Groups 13, 14, 15 and 16 of the periodic table, typically which supplant a carbon atom. For example, pyridine is a heteroatom containing form of benzene. Halogen refers to atoms from group 17 of the periodic table.

The terms "hydrocarbyl radical," "hydrocarbyl group," or "hydrocarbyl" interchangeably refer to a group consisting of hydrogen and carbon atoms only. A hydrocarbyl group can be saturated or unsaturated, linear, branched, cyclic or acyclic, aromatic or non-aromatic.

Substituted hydrocarbyl radicals are radicals in which at least one hydrogen atom has been substituted with a heteroatom or heteroatom containing group, preferably with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The term "$C_n$" group or compound refers to a group or a compound comprising carbon atoms at total number thereof of n. Thus, a "$C_m$-$C_n$" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic.

For purposes of this specification and the claims appended thereto, when a polymer or copolymer is referred to as comprising a cyclic olefin, including, but not limited to cyclic pentene (cC5), cyclic pentadiene and other cyclic C6-C9 hydrocarbons and their dienes, the cyclic olefin present in such unsaturated polymer or copolymer is the polymerized form of the cyclic olefin. A "polymer" has two or more of the same or different monomer units. A "homopolymer" is a polymer having monomer units that are the same. A "copolymer" is a polymer having two or more monomer units that are different from each other. "Different" as used to refer to monomers indicates that the monomers differ from each other by at least one atom or are different isomerically. An oligomer is a polymer having a low molecular weight, such as an $M_n$ of 21,000 g/mol or less (preferably 10,000 g/mol or less), and/or a low number of mer units, such as 100 mer units or less (preferably 75 mer units or less).

The term "cyclic olefin" refers to any cyclic species comprising at least one ethylenic double bond in a ring. The atoms of the ring may be optionally substituted. The ring may comprise any number of carbon atoms and/or heteroatoms. In some cases, the cyclic olefin may comprise more than one ring. A ring may comprise at least 3, at least 4, at least 5, at least 6, at least 7, at least 8, or more, atoms. Non-limiting examples of cyclic olefins include cyclopentene, cyclohexene, norbornene, dicyclopentadiene, bicyclo compounds, oxabicyclo compounds, and the like, all optionally substituted. "Bicyclo compounds" are a class of compounds consisting of two rings only, having two or more atoms in common.

Unless specified otherwise, the term "substantially all" with respect to a molecule refers to at least 90 mol % (such as at least 95 mol %, at least 98 mol %, at least 99 mol %, or even 100 mol %).

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition.

The terms "catalyst" and "catalyst compound" are used interchangeably and refer to a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, at least one activator, an optional co-activator, and an optional support material, where the system can polymerize one or more monomers to form polymer.

All numerical values within the detailed description and the claims herein are modified by "about" or "approximately" the indicated value, and take into account experimental error and variations that would be expected by a person having ordinary skill in the art.

In the present disclosure, unless specified otherwise, percent refers to percent by weight, expressed as "wt %."

In the present disclosure, all molecular weight data are in the unit of g mol$^{-1}$. Unless indicated otherwise, molecular weight of oligomer or polymer materials and distribution thereof in the present disclosure are determined using gel permeation chromatography employing a Tosoh EcoSEC High Temperature GPC system (GPC-Tosoh EcoSEC; Tosoh Bioscience LLC). GPC can be used to determine the polypentenamer Mw, Mn and Mw/Mn using the high temperature gel permeation chromatograph equipped with a differential refractive index detector (DRI). Three high temperature TSK gel column (Tosoh GMHHR-H(20)HT2) are used. The nominal flow rate is 1.0 mL/min, and the nominal injection volume is 300 μL. The various transfer lines, columns, and dual flow differential refractometer is contained in an oven maintained at 160° C. The mobile phase Solvent for the experiment is prepared by dissolving 1.2 grams of butylated hydroxytoluene as an antioxidant in 4 liters of Aldrich reagent grade 1,2,4 trichlorobenzene (TCB). The TCB mixture is next filtered through a 0.1 m teflon filter. The TCB is then degassed with an online degasser before entering the GPC instrument.

The polydispersity index (PDI), also referred to as the molecular weight distribution (MWD), of the material is then the ratio of $M_w/M_n$.

For purposes herein, the polymer trans:cis ratio can be measured with a standard $^{13}$C NMR techniques according to methods known in the art. Samples are prepared with 66.67 mg/ml of CDCl$_3$ (deuterated chloroform) in a 10 mm tube. The $^{13}$C NMR spectra is measured on a Bruker 600 MHz cryoprobe with inverse gated decoupling, 20 s delay, 90° pulse, and 512 transients. Assignments are based on assignments from O. Dereli et al. (2006) *European Polymer Journal*, v.42, pp. 368-374. Three different positions are used for calculation of the trans/cis composition:

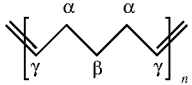

1. olefinic group (gamma) peaks with trans at 130.3 ppm and cis at 129.8 ppm;
2. alpha position trans/cis (tc) at 32.2 ppm, trans/trans (tt) at 32.07 ppm, cis/cis (cc) at 26.9 ppm and cis/trans (ct) at 26.74 ppm;
3. beta position cis/cis (cc) at 29.86 ppm, cis/trans (trans/cis) (ct+tc) at 29.7 ppm and trans/trans (tt) at 29.54 ppm;
4. Trans=tt+0.5*(ct+tc);
5. Cis=cc+0.5*(ct+tc); and
6. n is the number of repeating units.

The calculation for each of groups 1-3 above (i.e., gamma, alpha, and beta) are averaged to get an average trans and cis composition. The term "gamma", as used herein, refers to (CH=CH) groups. An exemplary $^{13}$C NMR spectra is shown in FIG. 1, which is an exemplary $^{13}$C NMR spectrum showing the chemical shift assignments of an illustrative cyclopentene polymer.

For purposes herein, small scale polymerization conversion rates can be monitored and estimated with $^1$H NMR method using a Bruker 400 MHz instrument, as indicated. Pulse program zgcw30 can be used with D1=60 s and ns=2 or 4. CDCl$_3$ can be the lock solvent. The chemical shift of cyclopentene monomer double bond protons is about 5.75 ppm and the chemical shift of polypentenamer double bond protons is about 5.53 ppm. Integral from 5.45 to 6.00 ppm ($I_{m+p}$) can be used to cover the two chemical shifts, which can be set to 100% to represent total cyclopentene. The integral from 4.55 to 5.60 ppm ($I_{p+RS}$) is assigned the polypentenamer overlap with the right $^{13}$C satellite chemical shift of cyclopentene. To substrate the $^{13}$C satellite contribution from the overlapped integral, the similar intensity left $^{13}$C satellite of cyclopentene can be integrated from 5.93 to 5.97 ppm ($I_{LS}$) and the conversion C calculated as follows: $C=(I_{P+RS}-I_{LS})/I_{m+p}$.

Appropriate $^{13}$C decoupling program is identified when the $I_{LS}$ is found to be zero.

$M_n$ is the number average molecular weight, Mw is the weight average molecular weight, and $M_z$ is the z average molecular weight. Molecular weight distribution (MWD) is defined to be $M_w$ divided by $M_n$. Unless otherwise noted, all molecular weight units (e.g., $M_w$, $M_n$, $M_z$) are g/mol or kDa (1,000 g/mol=1 kDa). The molecular weight distribution, molecular weight moments ($M_w$, $M_n$, $M_w/M_n$) and long chain branching indices are determined by using a Polymer Char GPC-IR, equipped with four in-line detectors, an 18-angle light scattering ("LS") detector, a viscometer and a differential refractive index detector ("DRI"). Three Agilent PLgel 10 μm Mixed-B LS columns are used for the GPC tests herein. The nominal flow rate can be 0.5 mL/min, and the nominal injection volume is 200 μL. The columns, viscometer and DRI detector are contained in ovens maintained at 40° C. The tetrahydrofuran (THF) solvent with 250 ppm antioxidant butylated hydroxytoluene (BHT) can be used as the mobile phase. The given amount of polymer samples are weighed and sealed in standard vials. After loading the vials in the auto sampler, polymers are automatically dissolved in the instrument with 8 mL added THF solvent at 40° C. for about two hours with continuous shaking. The concentration, C, at each point in the chromatogram is calculated from the baseline-subtracted DRI signal, $I_{DRI}$, using the following equation: $C=K_{DRI}I_{DRI}/(d_n/d_c)$, where $K_{DRI}$ is a constant determined by calibrating the DRI, and ($d_n/d_c$) is the incremental refractive index of polymer in THF solvent.

The conventional molecular weight can be determined by combining universal calibration relationship with the column calibration, which is performed with a series of monodispersed polystyrene (PS) standards ranging from 300 g/mol to 12,000,000 g/mol. The molecular weight "M" at each elution volume can be calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $a_{PS}$=0.7362 and $K_{PS}$=0.0000957 while "a" and "K" for the samples are 0.725 and 0.000291, respectively.

The LS molecular weight, M, at each point in the chromatogram can be determined by analyzing the LS output using the Zimm model for static light scattering and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from the DRI method, and the value of "n" is 1.40 for THF at 40° C. and λ=665 nm. For the samples used in this test, the dn/dc is measured as 0.1154 by DRI detector.

A four capillaries viscometer with a Wheatstone bridge configuration can be used to determine the intrinsic viscosity [η] from the measured specific viscosity ($\eta_S$) and the concentration "C", as follows: $\eta_S=C[\eta]+0.3(C[\eta])^2$.

The following abbreviations may also be used through this specification: Bu is butyl, n-Bu is normal butyl, i-Bu is isobutyl, t-Bu is tertiary butyl, p-t-Bu is para-tertiary butyl, Et is ethyl, Me is methyl, p-Me is para-methyl, Ph is phenyl, Pr is propyl, i-Pr is isopropyl, n-Pr is normal propyl, RT is room temperature (i.e., approximately 23° C.), THF is tetrahydrofuran, and tol is toluene.

A detailed description will now be provided. Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

The present disclosure provides new pre-catalysts and catalyst systems including same that are particularly useful for ring-opening metathesis polymerization (ROMP) of cyclic olefins, including cyclopentene and dicyclopentadiene (DCPD) and mixtures thereof. The catalysts provided herein have extended aromatic ligands and optionally can include one or more heteroatoms in the ligand. Such catalyst frameworks have demonstrated significantly higher activity that its predecessors not having the same ligands. Such substantial improvement in catalyst activity reduces the costs of materials (catalysts, activators) and process expenses. The high catalyst activity also decreases the amounts of catalyst residue left after polymerization. These new catalysts also have low toxicity and avoid the production of fatal, highly hazardous substances (SHS) upon contact with moisture.

Catalyst

The catalyst can include at least one metal alkoxide (I) and at least one transition metal halide (II) to form a transition metal precatalyst (III) according to the general formula:

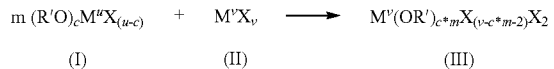

The transition metal precatalyst (III) can then be contacted with at least one metal alkyl activator (IV) to form an activated catalyst (V) comprising a transition metal carbene moiety $M^v=C(R^*)_2$ according to the general formula:

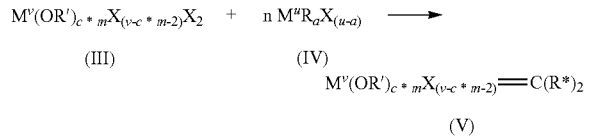

wherein:
$M^u$ is a Group 1, 2, or 13 metal of valence u, preferably $M^u$ is Li, Na, Ca, Mg, Al, or Ga;
c is from 1 to 3 and $\leq$u;
m=1/3, 1/2, 1, 3/2, 2, 3, or 4 and c*m$\leq$v-2;
a is 1, 2, or 3 and a$\leq$u;
n is a positive number and a*n is between 2 to 10;
$M^v$ is a Group 5 or 6 transition metal having valence (v) of 5 or 6, respectively, preferably v is 6 and $M^v$ is tungsten (W);
X is halogen,
each R' is independently a monovalent organic moiety comprising from 8 to 40 atoms (preferably 12 to 40 atoms; more preferably 18 to 40 atoms) selected from Groups 14-17 of the periodic table, which can include one or more heteroatoms;

each R is independently a $C_1$ to $C_8$ alkyl; and
each R* is independently H or a $C_1$ to $C_7$ alkyl.

In certain embodiments, the at least one metal alkoxide (I) can be or can include Group 2 metal (e.g., $Mg(OR')_2$) and Group 13 metal dialkoxides (e.g., $Al(OR')_2X$) and Group 13 metal trialkoxides (e.g., $Al(OR')_3$). In certain embodiments, the metal alkoxide (I) may include a Group 1 metal, e.g., NaOR' (u=1, c=1); a Group 2 metal, e.g., Mg(OR')Cl (u=2, c=1) or $Mg(OR')_2$ (u=2, c=2); or a Group 13 metal, e.g., $Al(OR')Cl_2$ (u=3, c=1), $Al(OR')_2Cl$ (u=3, c=2), or $Al(OR')_3$ (u=3, c=3).

In certain embodiments, each R' in the at least one metal alkoxide (I) is independently a linear, branched, or aromatic hydrocarbon. Each R' can also be functionalized using one or more groups selected from hydroxyl, thiol, ketone, aldehyde, ester, ether, amine, imine, amide, nitro, carboxylic acid, disulfide, carbonate, isocyanate, carbodiimide, carboalkoxyl, and halogen.

The metal alkoxide (I) can be formed by contacting a compound comprising a hydroxyl functional group (FI) with the metal alkyl activator (IV) to form the metal alkoxide (I) according to the general formula:

The metal alkoxide (I) also can be formed by contacting a compound comprising the hydroxyl functional group (FI) with a Group 1 or Group 2 metal hydride $M^{u*}(H)_u$ according to the general formula:

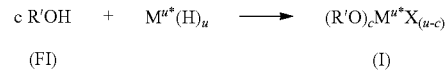

wherein $M^{u*}$ is a Group 1 or 2 metal of valence u*, preferably $M^u$ is Na, Li, Ca, or Mg;
c is 1 or 2 and c is $\leq$u*;
X is a halogen; and
each R' is independently a monovalent hydrocarbyl comprising from 8 to 40 atoms (preferably 12 to 40 atoms; more preferably 18 to 40 atoms) selected from Groups 14-17 of the periodic table, which can include one or more heteroatoms.

In certain embodiments, the metal alkoxide pre-catalyst (I) can be represented by one or more of the following general structures A-C:

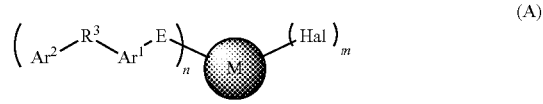

-continued (B)

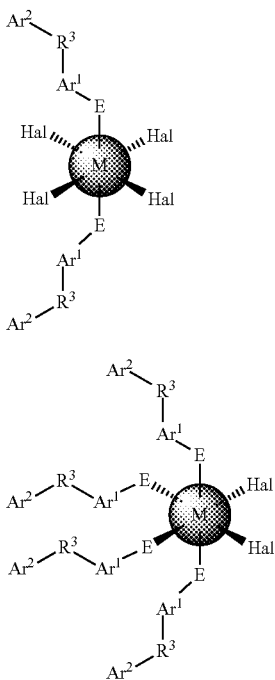

(C)

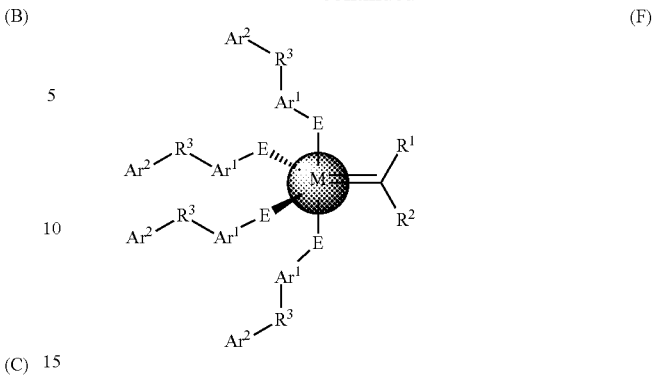

(F)

wherein $R^1$ is a H, alkyl, or aryl; and $R^2$ is a H, alkyl, or aryl, preferably both $R^1$ and $R^2$ are hydrogen.

Figure 2:
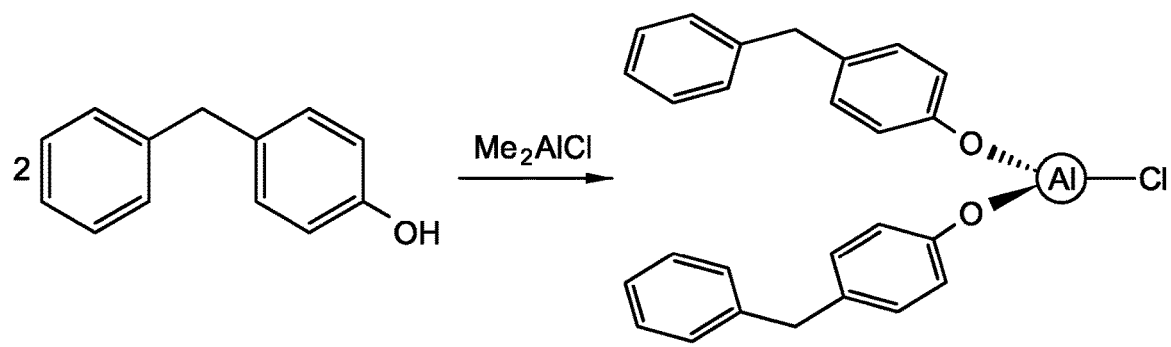
FIG. 2 shows an illustrative reaction scheme for forming a metal alkoxide (I) from the reaction of dimethylaluminum chloride with 2 equivalents of 4-benzylphenol.
Figure 3:
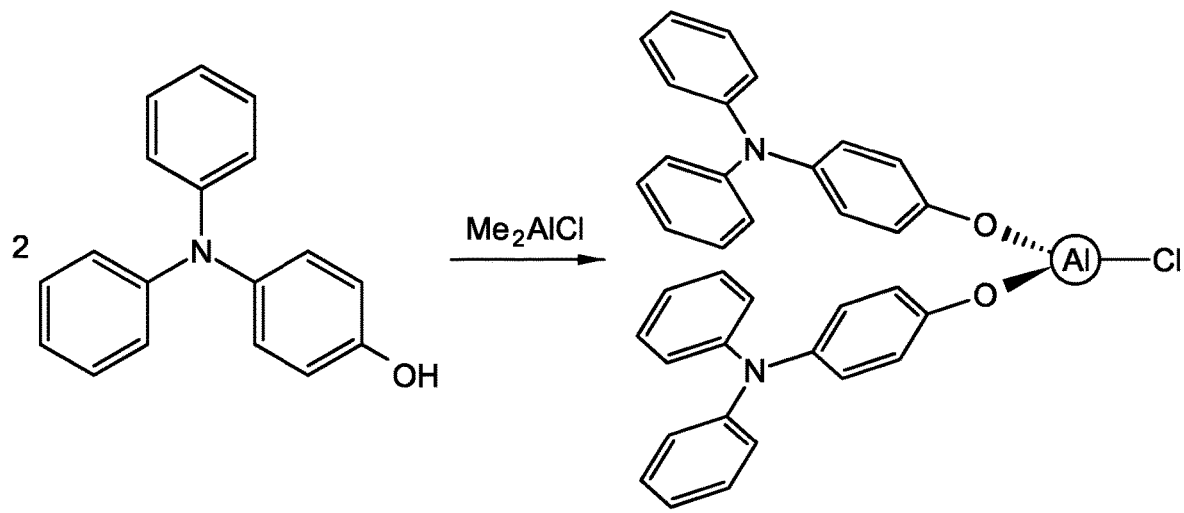
FIG. 3 shows an illustrative reaction scheme for forming a metal alkoxide (I) from the reaction of dimethylaluminum chloride with 2 equivalents of 4-(diphenylamino)phenol.

FIG. 2 shows an illustrative reaction scheme for forming the metal alkoxide (I) from the reaction of dimethylaluminum chloride with 2 equivalents of 4-benzylphenol. FIG. 3 shows an illustrative reaction scheme for forming a metal alkoxide (I) from the reaction of dimethylaluminum chloride with 2 equivalents of 4-(diphenylamino)phenol.

Considering the metal alkyl activator (IV) in more detail, $M^u$ can be a Group 1, 2, or 13 metal of valence u, preferably Li, Na, Ca, Mg, Al, or Ga; R is a $C_1$-$C_8$ alkyl; c is 1, 2, or 3; c≤u; and when present, X is halogen. The metal alkyl activator (IV) can also be an alkyl aluminum. A suitable alkyl aluminum activator has the general formula:

wherein: Hal is F, Cl, Br or I;
E is O or S;
$Ar^1$ is an aryl group;
$Ar^2$ is an aryl group; M is a Group 5 or 6 transition metal having valence v of 5 or 6, preferably Group 6, more preferably Mo or W;
$R^3$ is a $C_1$-$C_{10}$ alkyl, alkylene, alkyldiyl, silylene, silyldiyl, germylene, germyldiyl, O, S, $NAr^2$, or $PAr^2$, preferably a methylene group;
n=1-4, m=2-5 for n+m=6, for Group 6 metals in the oxidation state +6, preferably n=2 and m=4 (Structure B) or n=4 and m=2 (Structure C); and
n=1-3, m=2-4 for n+m=5 for Group 5 and 6 metals in the oxidation state +5.

In certain embodiments, the activated catalyst (V) can be represented by one or more of the following general structures D-F:

$$AlR^*_r(Y)_{3-r}$$

wherein $R^*$ is a $C_1$-$C_8$ alkyl, each Y is hydrogen, halogen, or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and r is 1 to 3.

Figure 4:
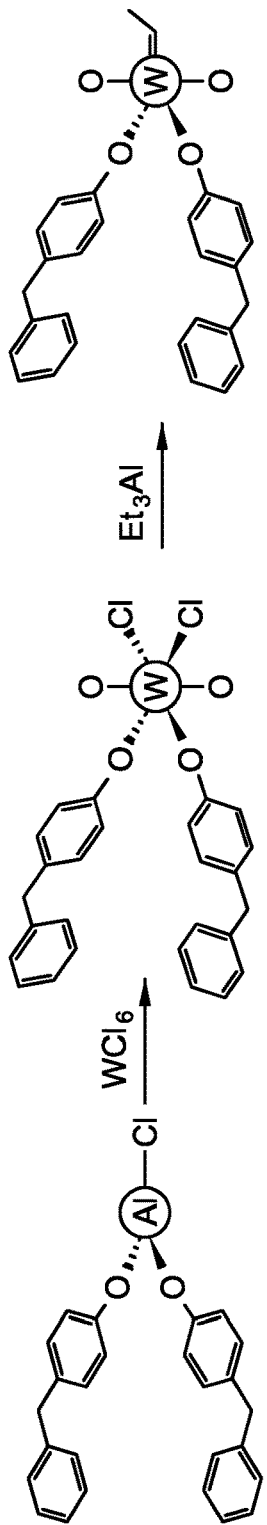
FIG. 4 shows an illustrative reaction scheme for forming the transition metal precatalyst (III) from the reaction of the metal alkoxide (I) in FIG. 2 with a transition metal halide (II) being tungsten hexachloride ($WCl_6$) and then forming an activated catalyst (V) having the active metal carbene moiety.

FIG. 4 shows an illustrative reaction scheme for forming the transition metal precatalyst (III) from the reaction of the metal alkoxide (I) in FIG. 2 with a transition metal halide (II) being tungsten hexachloride ($WCl_6$) and then forming the activated catalyst (V) having the active metal carbene moiety.

Figure 5:
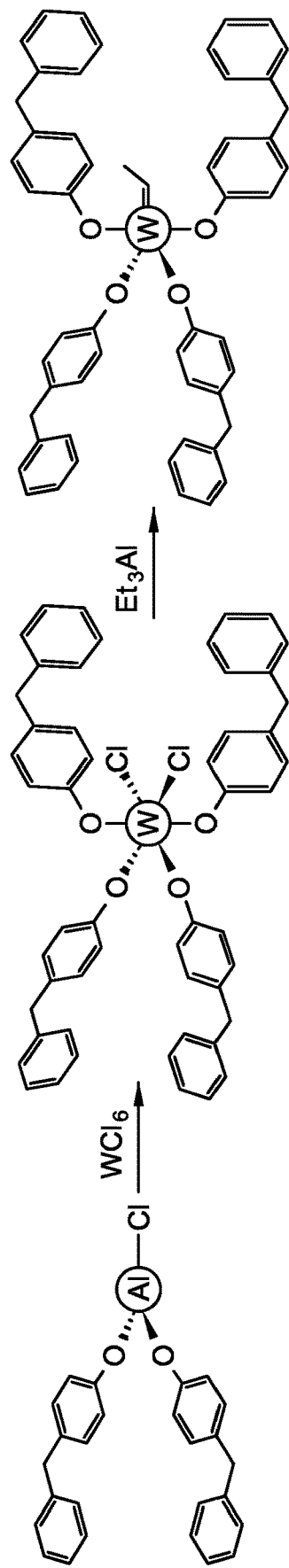
FIG. 5 shows an illustrative reaction scheme for forming the transition metal precatalyst (III) from the reaction of the metal alkoxide (I) in FIG. 3 with a transition metal halide (II) being tungsten hexachloride ($WCl_6$) and then forming an activated catalyst (V) having the active metal carbene moiety.

FIG. 5 shows an illustrative reaction scheme for forming the transition metal precatalyst (III) from the reaction of the metal alkoxide (I) in FIG. 3 with the transition metal halide (II) being tungsten hexachloride ($WCl_6$) and then forming the activated catalyst (V) having the active metal carbene moiety.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, (D)

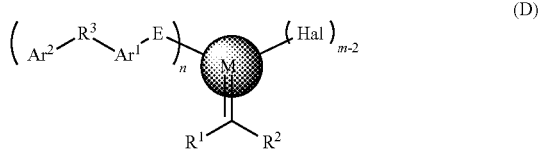

(E)

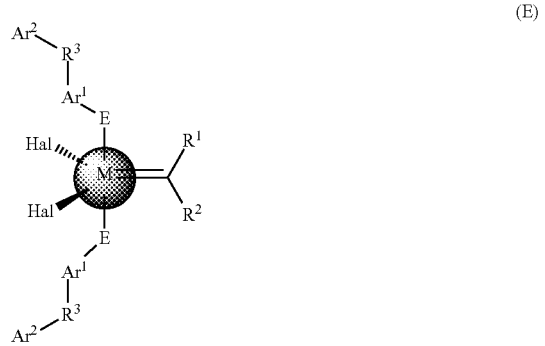

zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 m. Most preferably the surface area of the support material is in the range is from about 100 to about 400 $m^2$/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON™ 952 or DAVISON™ 955 by the Davison Chemical Division of W.R. Grace and Company. In other embodiments DAVISON™ 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization

Figure 6:
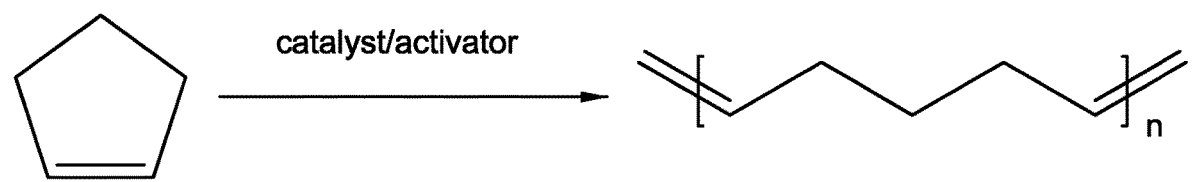
FIG. 6 depicts an illustrative polymerization scheme for making polypentenamers from cyclopentene using the catalyst systems provided herein.

The catalysts provided herein can be used for ring opening metathesis polymerization (ROMP) for making polymers comprising one or more polyalkenamers such as polypentenamer. Such polymers may also include a cyclic olefin homopolymer and/or a cyclic olefin copolymer. FIG. 6 depicts an illustrative polymerization scheme for making polypentenamers from cyclopentene.

The reaction can be carried out in a continuous reactor or batch reactors. The reaction also can be carried out in slurry phase or solution. For simplicity and ease of description, however, the polymerization process for making polypenenamers using the catalyst described herein will be further described with reference to a solution polymerization in a diluent whereby the reaction mixture can include one or more diluents at 60 vol % or less, or 40 vol % or less, or 20 vol % or less, based on the total volume of the reaction mixture. Suitable diluents can include non-coordinating, inert liquids. Examples of suitable diluents can include, but are not limited to, straight and branched-chain hydrocarbons (e.g., isobutane, butane, pentane, isopentane, hexanes, isohexane, heptane, octane, dodecane, and mixtures thereof); cyclic and alicyclic hydrocarbons (e.g., cyclohexane, cycloheptane, methylcyclohexane, methylcycloheptane, and mixtures thereof such as ISOPAR™ (synthetic isoparaffins, commercially available from ExxonMobil Chemical Company)); perhalogenated hydrocarbons (e.g., perfluorinated $C_4$-$C_{10}$ alkanes, chlorobenzene, and aromatic); alkyl substituted aromatic compounds (e.g., benzene, toluene, mesitylene, and xylene); and the like, and any combination thereof.

The preparation of the catalyst and/or the copolymerization may be carried out in an inert atmosphere (e.g., under a nitrogen or argon environment) to minimize the presence of air and/or water. The polymerization can include contacting one or more $C_4$-$C_{20}$ cyclic olefin monomers in a polymerization reactor under conditions sufficient to form a reaction mixture comprising a polymer, monomer, catalyst, and optionally a diluent. The polymer, the catalyst, and optionally the solvent can be recovered from the reaction product mixture. At least a portion of the recovered catalyst, unreacted cyclic olefin monomer, and optionally the solvent can be recycled to the polymerization reactor.

The temperature of the reaction may be −50° C. to 200° C., or −25° C. to 100° C., or −10° C. to 25° C. The pressure of the reaction may be from 0 MPa to 50 MPa, or 0 MPa to 25 MPa, or ambient pressure to 10 MPa. The reaction may be carried out over a period of time, which may be from 1 minute to 48 hours, or 1 minute to 20 hours, or 5 minutes to 3 hours, or 10 minutes to 1 hour.

A suitable mol ratio of metal in the catalyst to total comonomer may be 1:1 to 1000:1. Other suitable mol ratios of metal in the catalyst to total comonomer may be 1:1 to 250:1, 1:1 to 50:1, 1:1 to 10:1, 10:1 to 100:1, 50:1 to 250:1, 100:1 to 500:1, or 250:1 to 1000:1.

The cyclic olefins may be strained or unstrained (preferably strained); monocyclic or polycyclic (e.g., bicyclic); and optionally include heteroatoms and/or one or more functional groups. Examples of cyclic olefins suitable for use as (co)monomers in the methods of the present disclosure include, but are not limited to, cyclooctene, 1,5-cyclooctadiene, 1-hydroxy-4-cyclooctene, 1-acetoxy-4-cyclooctene, 5-methylcyclopentene, dicyclopentadiene (DCPD), cyclopentene (cC5), norbornene, norbornadiene, cycloheptene, cyclooctene, cyclooctadiene, cyclododecene, 7-oxanorbornene, 7-oxanorbornadiene, cis-5-norbornene-endo-2,3-dicarboxylic anhydride, dimethyl norbornene carboxylate, norbornene-exo-2,3-carboxylic anhydride, and their respective homologs and derivatives, and substituted derivatives therefrom. Illustrative examples of suitable functional groups include, but are not limited to, hydroxyl, thiol, ketone, aldehyde, ester, ether, amine, imine, amide, nitro, carboxylic acid, disulfide, carbonate, isocyanate, carbodiimide, carboalkoxyl, and halogen.

The cyclic olefins may further include one or more $C_4$-$C_{20}$ cyclic diolefins comprising at least one cyclic structure having the general formula:

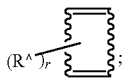

one or more functionalized $C_4$-$C_{20}$ cyclic diolefins comprising at least one cyclic structure according to the general formula:

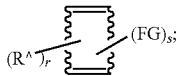

as a comonomer into the reaction product mixture, wherein each functional group (FG) is integral to a corresponding cyclic structure and/or pendant to a corresponding cyclic structure, and wherein each FG is independently halogen, $NR\hat{\ }_2$, $OR\hat{\ }$, $SeR\hat{\ }$, $TeR\hat{\ }$, $PR\hat{\ }_2$, $AsR\hat{\ }_2$, $SbR\hat{\ }_2$, $SR\hat{\ }$, $BR\hat{\ }_2$, $SiR\hat{\ }_3$, $GeR\hat{\ }_3$, $SnR\hat{\ }_3$, $PbR\hat{\ }_3$, O, S, Se, Te, $NR\hat{\ }$, $PR\hat{\ }$, $AsR\hat{\ }$, $SbR\hat{\ }$, $BR\hat{\ }$, $SiR\hat{\ }_2$, $GeR\hat{\ }^2$, $SnR\hat{\ }_2$, $PbR\hat{\ }_2$, or a combination thereof, and each $R\hat{\ }$ is independently hydrogen or a $C_1$-$C_{10}$ hydrocarbyl radical, r is greater than or equal to 1, and when present, s is greater than or equal to 1; preferably wherein the comonomer comprises norbornene, ethylidene norbornene, dicyclopentadiene, or a combination thereof.

In one or more embodiments of the invention, the cyclic olefin polymerization process further comprises:
(I) controlling $M_w$ and/or a trans:cis ratio of the polymer by controlling a reactor temperature from −35° C. to 100° C.; controlling the amount of monomer recycled to the reactor; using the monomer as a reaction solvent; or a combination thereof;
(II) forming active catalyst species at a temperature less than or equal to about 5° C., followed by increasing the reaction temperature to a temperature less than 100° C.;
(III) incorporating an amount of an olefin, preferably an alpha olefin, preferably an alpha olefin comprising at least one hetero atom containing functional group into the cyclic olefin monomer to reduce the molecular weight of the polymer in the product mixture;
(IV) employing two or more cyclic olefin polymerization catalysts in the same or different reactors to produce polymer exhibiting:
  i) a multi-modal Mw profile;
  ii) a trans:cis molar ratio greater than 1;
  iii) a trans:cis molar ratio less than 1; and/or
(V) employing multiple reactors connected in a sequence to produce heterophasic copolymers.

In one or more embodiments of the invention, the olefin comonomer has the general formula:

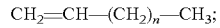

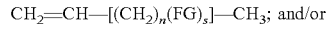

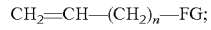

wherein each FG, when present, is independently halogen, $NR\hat{\ }_2$, $OR\hat{\ }$, $SeR\hat{\ }$, $TeR\hat{\ }$, $PR\hat{\ }2$, $AsR\hat{\ }2$, $SbR\hat{\ }2$, $SR\hat{\ }$, $BR\hat{\ }2$, $SiR\hat{\ }_3$, $GeR\hat{\ }_3$, $SnR\hat{\ }_3$, $PbR\hat{\ }_3$, O, S, Se, Te, $NR\hat{\ }$, $PR\hat{\ }$, $AsR\hat{\ }$, $SbR\hat{\ }$, $BR\hat{\ }$, $SiR\hat{\ }_2$, $GeR\hat{\ }^2$, $SnR\hat{\ }_2$, $PbR\hat{\ }_2$, or a combination thereof, and each $R\hat{\ }$ is independently a $C_1$-$C_{10}$ hydrocarbyl radical; n is greater than or equal to 1; and s, when present, is greater than or equal to 1.

In one or more embodiments of the invention, the transition metal $M^v$ is preferably present in the catalyst at from 0.1 wt % to 30 wt %, based on the total amount of catalyst present. In some embodiments, a molar ratio of transition metal $M^v$ to aluminum ($M^v$:Al) in the supported catalyst is preferably from 1:1000 to 4:10, based on the total number of moles of $M^v$ and aluminum present.

One or more quenching compounds can be used to stop the polymerization reaction when desired. Suitable quenching compounds can be or can include one or more antioxidants, which may be dispersed in alcohols (e.g., methanol or ethanol). Examples of quenching compounds may include, but are not limited to, butylated hydroxytoluene (BHT), IRGANOX™ antioxidants (available from BASF), and the like, and any combination thereof. The quenching compounds can be added to the reaction mixture at 0.05 wt % to 5 wt %, or 0.1 wt % to 2 wt % based on the total weight of the polymer product.

Polymer Properties

The properties of the polymers produced may depend, at least in part, on the composition of the catalyst, the composition of the (co)monomers, the rate of addition of the comonomer, the reaction temperature, and the reaction time. If two cyclic olefin comonomers are used, the copolymers produced may have a mol ratio of a first cyclic olefin comonomer-derived units to a second cyclic olefin comonomer-derived units of 3:1 to 100:1, or 4:1 to 75:1, or 5:1 to 50:1, or 6:1 to 35:1. If desired, a slower rate of addition of the second comonomer in combination with high concentration of the first cyclic olefin comonomer may lead to a higher amount of first cyclic olefin comonomer-derived units in the resultant polymer.

The ratio of cis to trans in the polymers produced may be 95:5 to 5:95, or 95:5 to 80:20, or 80:20 to 60:40, or 75:25 to 50:50, or 75:25 to 25:75, or 50:50 to 5:95, or 40:60 to 5:95, or 30:70 to 5:95, or 20:80 to 5:95, or 20:80 to 10:90, or 100:0 for both comonomer entities. The targeted cis/trans ratio may be achieved by appropriate selection of the catalysts and activators, catalyst:activator ratios, catalyst:monomer ratios, concentrations of reagents, solvents and mixtures of solvents, process temperature, and reaction times, and any combination thereof.

Polymers produced may have a $M_w$ of 1 kDa to 1,000 kDa, or 10 kDa to 1,000 kDa, or 100 kDa to 1,000 kDa, or 250 kDa to 750 kDa, or 250 kDa to 550 kDa.

Polymers produced may have a $M_n$ of 0.5 kDa to 500 kDa, or 1 kDa to 250 kDa, or 10 kDa to 250 kDa, or 50 kDa to 250 kDa, or 100 kDa to 500 kDa.

Polymers of the present disclosure may have a MWD of 1 to 10, or 1 to 5, or 2 to 4, or 1 to 3.

Additionally, the level of LCB can be quantified by the GPC method with triple detector via a branching index ($g'_{vis}$). The branching index ($g'_{vis}$ or simply g') is defined as the ratio of the intrinsic viscosity of the branched polymer to the intrinsic viscosity of a linear polymer of equal molecular weight. The branching index g' is defined mathematically as:

$$g' = \frac{[\eta]_{avg}}{kM_v^\alpha}.$$

The Mv is the viscosity-average molecular weight based on molecular weights determined by LS analysis. The Mark-Houwink parameters a and k used for the reference linear polymer are 0.725 and 0.000291, respectively.

The polymers of the present disclosure having long chain branching may have a $g'_{vis}$ of 0.5 to 0.91, 0.5 to 0.8, or 0.6 to 0.8, or 0.7 to 0.91. The polymers of the present disclosure having a linear structure may have a $g'_{vis}$ of 0.92 to 1.0, 0.92 to 0.95, or 0.95 to 0.99, or 0.95 to 1.0.

The polymers produced having a long chain branching structure may have (a) a $g'_{vis}$ of 0.5 to 0.91, 0.5 to 0.8, or 0.6 to 0.8, or 0.7 to 0.91 and one or more of (b) a mol ratio of first cyclic olefin comonomer-derived units to second cyclic olefin comonomer-derived units of 3:1 to 100:1, or 4:1 to 75:1, or 5:1 to 50:1, or 6:1 to 35:1, (b) a ratio of cis to trans of 5:5 to 5:95, or 95:5 to 80:20, or 80:20 to 60:40, or 75:25 to 50:50, or 75:25 to 25:75, or 40:60 to 5:95, or 30:70 to 5:95, or 20:80 to 5:95, or 20:80 to 10:90, or 100:0 for both comonomer entities, (d) a $M_w$ of 1 kDa to 1,000 kDa, or 10 kDa to 1,000 kDa, or 100 kDa to 1,000 kDa, or 250 kDa to 750 kDa, or 250 kDa to 550 kDa, (e) a $M_n$ of 0.5 kDa to 500 kDa, or 1 kDa to 250 kDa, or 10 kDa to 250 kDa, or 50 kDa to 250 kDa, or 100 kDa to 500 kDa, and (f) a MWD of 1 to 10, or 1 to 5, or 2 to 4, or 1 to 3.

The polymers produced having a linear structure may have (a) a $g'_{vis}$ of 0.92 to 1.0, 0.92 to 0.95, or 0.95 to 0.99, or 0.95 to 1.0 and one or more of (b) a mol ratio of first cyclic olefin comonomer-derived units to second cyclic olefin comonomer-derived units of 3:1 to 100:1, or 4:1 to 75:1, or 5:1 to 50:1, or 6:1 to 35:1, (c) a ratio of cis to trans of 5:5 to 5:95, or 95:5 to 80:20, or 80:20 to 60:40, or 75:25 to 50:50, or 75:25 to 25:75, or 40:60 to 5:95, or 30:70 to 5:95, or 20:80 to 5:95, or 20:80 to 10:90, or 100:0 for both comonomer entities, (d) a $M_w$ of 1 kDa to 1,000 kDa, or 10 kDa to 1,000 kDa, or 100 kDa to 1,000 kDa, or 250 kDa to 750 kDa, or 250 kDa to 550 kDa, (e) a $M_n$ of 0.5 kDa to 500 kDa, or 1 kDa to 250 kDa, or 10 kDa to 250 kDa, or 50 kDa to 250 kDa, or 100 kDa to 500 kDa, and (f) a MWD of 1 to 10, or 1 to 5, or 2 to 4, or 1 to 3.

EXAMPLES

Embodiments discussed and described herein can be further described with the following non-limiting examples. Although the examples are directed to specific embodiments, they are not to be viewed as limiting in any specific respect. Methodologies for characterization of the samples (NMR and GPC) are included in embodiments 0042-0053.

Two different catalyst systems were prepared and used to polymerize cyclopentene (cC5). Example 1 used a (4-PhCH$_2$C$_6$H$_4$O)$_2$AlCl pre-catalyst and Example 2 used a (4-(Ph$_2$N)C$_6$H$_4$O)$_2$AlCl precatalyst. Both precatalysts were activated using a mixture of WCl$_6$ in toluene and used to polymerize cyclopentene to provide a solid polypentenamer product. A comparative example using (4-MeC$_6$H$_4$O)$_2$AlCl as the precatalyst is also provided (Comp.Ex.3). As summarized below in Table 1, the polymers produced using the catalyst systems of Examples 1 and 2 provided a polypentenamer product having the desired cis trans ratio of about 20/80, a narrow molecular MWD (about 2.0) and a $M_w$ of up to 563 kDa. It was surprisingly and unexpectedly discovered, however, that the activity of the (4-PhCH$_2$C$_6$H$_4$O)-based system (Ex. 1) and the (4-(Ph$_2$N)C$_6$H$_4$O)-based system (Ex.2) were significantly higher than all the others. It was even more surprising and unexpected to find that the activity of the (4-PhCH$_2$C$_6$H$_4$O)-based system (Ex. 1) was 2,070 $g_{polymer}$/gw, which was more than twice the activity of the (4-MeC$_6$H$_4$O)-based system (976 $g_{polymer}$/gw) (Comp.Ex. 3).

Example 1: (4-PhCH$_2$C$_6$H$_4$O) Based Catalyst

Synthesis of (4-PhCH$_2$C$_6$H$_4$O)$_2$AlCl pre-catalyst (W:monomer ratio is 1:4000). A solution of 4-benzylphenol (60.0 g, 326 mmol) in toluene (350 mL) was slowly added over 1 h to the solution of dimethylaluminum chloride (15.06 g, 163 mmol) in toluene (50 mL) under intense stirring. The resulting mixture was stirred for 12 hours at 25° C. before adding n-pentane (100 mL). Then, the resulting mixture was stirred for additional 24 hours. The precipitated solid product was then collected, washed with n-pentane (3×100 mL) and dried in vacuo at 75° C. for 3 hours.

Yield: 63.7 g (91.2%) of a white solid. $^1$H NMR (400 MHz, THF-d$_8$, 25° C., ppm): (7.21-7.09 (8H, m, Ar—H), 6.92 (4H, d, J$_{HH}$=7.6 Hz, Ar—H), 6.78-6.69 (4H, m, Ar—H), 3.82 (4H, s, CH$_2$). $^{13}$C NMR (100.63 MHz, THF-d$_8$, 25° C., ppm): (158.7, 143.1, 130.1, 129.2, 128.7, 126.1, 119.7, 119.6 (Ar—C), 41.7 (CH$_2$).

Example 1A. Polymerization of cyclopentene using the (4-PhCH$_2$C$_6$H$_4$O)$_2$AlCl precatalyst (W:monomer=1:10,000). Solid (4-PhCH$_2$C$_6$H$_4$O)$_2$AlCl (130 mg, 0.303 mmol) was added to a solution of WCl$_6$ (60 mg, 0.151 mmol) in toluene (20 mL). The resulting solution was stirred at ambient conditions for 1 hour. The obtained solution was added to the mechanically stirred mixture (400 rpm), containing cyclopentene (103 g, 1.513 mol), triethylaluminum (35 mg, 0.303 mmol) and toluene (250 mL) at 0° C. The reaction was agitated for 3 hours at 0° C. Then, the active catalyst was quench by adding 2,6-di-tert-butyl-4-methylphenol (1.0 g) in ethanol/toluene (20/80 mL). The resulting solution was poured into ethanol (1 L) under intense mechanical stirring. The precipitated polymer was washed with ethanol (3×250 mL) and dried the stream of nitrogen for 3 days.

Yield: 57.5 g, 56%. Cis trans ratio: 19/81%. $M_w$ 563 kDa, $M_w$/MI 2.02.

Example 1B. Polymerization of cyclopentene using the (4-PhCH$_2$C$_6$H$_4$O)$_2$AlCl precatalyst (W:monomer=1:4,000). Solid (4-PhCH$_2$C$_6$H$_4$O)$_2$AlCl (288 mg, 0.631 mmol) was added to a solution of WCl$_6$ (125 mg, 0.316 mmol) in toluene (20 mL). The resulting solution was stirred at ambient conditions for 1 hour. The obtained solution was added to the mechanically stirred mixture (400 rpm), containing cyclopentene (85.86 g, 1.263 mol), triethylaluminum (72 mg, 0.632 mmol) and toluene (250 mL) at 0° C. The reaction was agitated for 3 hours at 0° C. Then, the active catalyst was quench by adding 2,6-di-tert-butyl-4-methylphenol (1.0 g) in ethanol/toluene (20/80 mL). The resulting solution was poured into ethanol (1 L) under intense mechanical stirring. The precipitated polymer was washed with ethanol (3×250 mL) and dried the stream of nitrogen for 3 days.

Yield: 77.0 g, 90%. Cis trans ratio: 18/82%. $M_w$ 515 kDa, $M_w/M_n$ 1.82.

Example 1C. Copolymerization of cyclopentene with dicyclopentadiene using the (4-PhCH$_2$C$_6$H$_4$O)$_2$AlCl precatalyst (W:monomer=1:4,000). The catalyst was formed in situ by adding solid (4-(PhCH$_2$)C$_6$H$_4$O)$_2$AlCl (865 mg, 2.02 mmol) to a solution of WCl$_6$ (400 mg, 1.01 mmol) in toluene (20 mL). After stirring for one hour at ambient conditions, the resulting mixture was added to a solution containing cyclopentene (first comonomer) (275 g, 4.035 mol), triethylaluminum (230 mg, 2.02 mmol), and toluene (1200 mL) at 0° C. A solution of DCPD (second comonomer) (3.60 g, 27.3 mmol) in toluene (15 mL) was slowly added to the reaction mixture over 35 minutes under intense mechanical stirring. After an additional 20 minutes, a solution of 2,6-di-tert-butyl-4-methylphenol (2.00 g, 9.0 mmol) in 100 mL of ethanol/toluene mixture (1:4, v:v, respectively) was added. The obtained mixture was added to ethanol (1 L). The precipitated polymer was washed 3 times with ethanol (500 mL each) and dried under vacuum at 55° C. for 4 hours to give 98 g of the product.

Yield: 98 g, 35%. 2.4 mol % DCPD. Cis trans ratio: 20/80%. M$_w$ 614 kDa, M$_w$/M$_n$ 1.70, g'(Z averaged) 0.93, g'(vis averaged) 0.91.

Example 2: (4-(Ph$_2$N)C$_6$H$_4$O)-Based Catalyst

Synthesis of (4-(Ph$_2$N)C$_6$H$_4$O)$_2$AlCl pre-catalyst. A solution of (4-HO—C$_6$H$_4$)NPh$_2$ (452 mg, 1.73 mmol) in toluene (10 mL) was added dropwise to the solution of dimethylaluminum chloride (80 mg, 0.86 mmol) in toluene (5 mL) at −30° C. After the addition was completed, the reaction mixture was allowed to gradually warm to 25° C. over 30 minutes and stirred for additional 30 minutes. The resulting solution was concentrated to ca 5 mL. The addition of n-pentane (15 mL) to the solution afforded the precipitation of a pale solid which was collected and dried in vacuo.

Yield: 418 mg (82.9%) of a pale green powder. $^1$H NMR (400 MHz, THF-d$_8$, 25° C., ppm): (7.20-7.08 (10H, m, Ar—H), 6.98-6.80 (18H, m, Ar—H). Low solubility of (4-(Ph$_2$N)C$_6$H$_4$O)$_2$AlCl precludes the collection of a satisfactory $^{13}$C NMR spectrum.

Polymerization using the 4-((Ph$_2$N)C$_6$H$_4$O)$_2$AlCl pre-catalyst (W:monomer=1:4,000) Toluene (20 mL) was added to a mixture of solid (4-(Ph$_2$N)C$_6$H$_4$O)$_2$AlCl (426 mg, 0.731 mmol) and solid WCl$_6$ (145 mg, 0.366 mmol). The resulting solution was stirred at ambient conditions for 1 hour before adding to the mechanically stirred mixture (400 rpm), containing cyclopentene (99.7 g, 1.46 mol), triethylaluminum (84 mg, 0.0.731 mmol) and toluene (500 mL) at 0° C. The reaction was agitated for 2 hours at 0° C. The active catalyst was then quenched by adding 2,6-di-tert-butyl-4-methylphenol (1.0 g, 4.5 mmol) in ethanol/toluene (20/80 mL). The resulting solution was poured into ethanol (1 L) under intense mechanical stirring. The precipitated polymer was washed with ethanol (3×250 mL) and dried in vacuo for 12 hours.

Yield: 33.7 g, 33.8%. Cis/trans ratio: 20/80%. Mw 605 kDa, Mw/Mn 1.44.

Comparative Example: (4-MeC$_6$H$_4$O)-Based Catalyst

Synthesis of (4-MeC$_6$H$_4$O)$_2$AlCl precatalyst. Dimethylaluminum chloride (21.38 g, 231 mmol) was dissolved in 250 mL of toluene in a 500 mL round bottom flask containing a magnetic stir bar. p-Cresol (50 g, 462 mmol, Sigma-Aldrich) was added dropwise over 30 minutes to the dimethylaluminum chloride solution under intense stirring. Then, the mixture was allowed to gradually return to ambient temperature. After additional stirring for 3 hours, the mixture was concentrated by purging nitrogen to give a yellow oily product. Pentane (300 mL) was added and the formed colorless solid was collected by filtration. Washing with pentane (200 mL) and drying in vacuo at 60° C. for 5 hours gave 46.7 g (73.0%) of a colorless powder. $^1$H NMR (400 MHz, THF-d$_8$, ppm): (6.89-6.66 (4H, m, Ar—H), 2.18 (3H, s, CH$_3$).

Comparative Example 3A: Polymerization using the (4-MeC$_6$H$_4$O)$_2$AlCl precatalyst (W:monomer=1:10,000). Solid (4-MeC$_6$H$_4$O)$_2$AlCl (84 mg, 0.303 mmol) was added to a solution of WCl$_6$ (60 mg, 0.151 mmol) in toluene (20 mL) and stirred for 1.0 hour at room temperature. The resulting mixture was then added to the solution of cyclopentene (103 g, 1.513 mmol) and triethylaluminum (86 mg, 0.757 mmol) in toluene (500 mL) at 0° C. under mechanical stirring (rpm 400). The mixture became viscous after about 20 minutes of the reaction time. After 3 hours at 0° C., the solution of 2,6-di-tert-butyl-4-methylphenol (1.0 g, 4.5 mmol) in ethanol (20 mL)/toluene (100 mL) was added. The resulting mixture was poured into ethanol (1.5 L) under intense mechanical mixing. The formed polymer was washed with ethanol (3×500 mL) and dried in vacuo at 50° C. for 4 hours.

Yield: 15.6 g (15.1%); cis:trans ratio: 25/75%; M$_w$: 464 kDa; M$_w$/M$_n$: 3.41.

Comparative Example 3B: Polymerization using the (4-MeC$_6$H$_4$O)$_2$AlCl precatalyst (W:monomer=1:4,000). Solid (4-MeC$_6$H$_4$O)$_2$AlCl (209 mg, 0.747 mmol) was added to a solution of WCl$_6$ (150 mg, 0.378 mmol) in toluene (20 mL) and stirred for 1.0 hour at room temperature. The resulting mixture was then added to the solution of cyclopentene (103 g, 1.513 mmol) and triethylaluminum (86 mg, 0.757 mmol) in toluene (500 mL) at 0° C. under mechanical stirring (rpm 400). The mixture became viscous after about 20 minute of the reaction time. After 3 hours at 0° C., the solution of 2,6-di-tert-butyl-4-methylphenol (1.0 g, 4.5 mmol) in ethanol (20 mL)/toluene (100 mL) was added. The resulting mixture was poured into ethanol (1.5 L) under intense mechanical mixing. The formed polymer was washed with ethanol (3×500 mL) and dried in vacuo at 50° C. for 4 hours.

Yield: 65.5 g (63.6%); cis:trans ratio: 15/85%; M$_w$: 490 kDa; M$_w$/M$_n$: 2.02.

TABLE 1

Polymerization Summary

| | W:monomer (s) ratio | Conversion (mol %) | Activity (g$_{polymer}$/gw) | cis/ trans | M$_w$, kDa | M$_w$/M$_n$ |
|---|---|---|---|---|---|---|
| Ex. 1A | 1:10,000 | 56 | 2070 | 19/81 | 563 | 2.02 |
| Ex. 1B | 1:4,000 | 90 | 1330 | 18/82 | 515 | 1.82 |
| Ex. 1C | 1:4,020 | 35 | 517 | 20/80 | 614 | 1.70 |
| Ex. 2 | 1:4,000 | 34 | 503 | 20/80 | 605 | 1.44 |
| Comp. Ex. 3A | 1:10,000 | 15 | 558 | 25/75 | 464 | 3.41 |
| Comp. Ex. 3B | 1:4,000 | 64 | 976 | 15/85 | 490 | 2.02 |

In each example above, the molecular weight distribution, molecular weight moments (Mw, Mn, Mw/Mn) and long chain branching indices were determined by using a Polymer Char GPC-IR, equipped with three in-line detectors, a 18-angle light scattering ("LS") detector, a viscometer and a differential refractive index detector ("DRI"). Three Agilent PLgel 10 μm Mixed-B LS columns were used for the GPC tests herein. The nominal flow rate was 0.5 mL/min, and the nominal injection volume was 200 μL. The columns, viscometer and DRI detector were contained in ovens maintained at 40° C. The tetrahydrofuran (THF) solvent with 250 ppm antioxidant butylated hydroxytoluene (BHT) was used as the mobile phase. Given amount of polymer samples were weighed and sealed in standard vials. After loading the vials in the autosampler, polymers were automatically dissolved in the instrument with 8 mL added THF solvent at 40° C. for about 2 hours with continuous shaking. The concentration, c, at each point in the chromatogram was calculated from the baseline-subtracted DRI signal, IDRI, using the following equation:

$$c = K_{DRI} I_{DRI}/(dn/dc),$$

where KDRI is a constant determined by calibrating the DRI, and (dn/dc) is the incremental refractive index of polymer in THF solvent.

The conventional molecular weight was determined by combining universal calibration relationship with the column calibration which was performed with a series of monodispersed polystyrene (PS) standards ranging from 300 g/mole to 12,000,000 g/mole. The molecular weight "M" at each elution volume was calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, aPS=0.7362 and KPS=0.0000957 while "a" and "K" for the rubber samples were obtained as 0.725/0.000291 by fitting the log IV vs. log M curve for a linear reference sample, where the IV stands for the intrinsic viscosity.

The LS molecular weight, M, at each point in the chromatogram was determined by analyzing the LS output using the Zimm model for static light scattering and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where NA is Avogadro's number, and (dn/dc) is the incremental refractive index for the system, which takes the same value as the one obtained from DRI method, and the value of "n" is 1.40 for THF at 40° C. and $\lambda$=665 nm. For the rubber samples used in this test, the dn/dc is measured as 0.1154 by DRI detector.

A four capillaries viscometer with a Wheatstone bridge configuration was used to determine the intrinsic viscosity [η] from the measured specific viscosity (ηS) and the concentration "c".

$$\eta_s = c[\eta] + 0.3(c[\eta])^2,$$

The average intrinsic viscosity, [η]avg, of the sample was calculated using the following equation:

$$[\eta]_{avg} = \frac{\sum c_i [\eta]_i}{\sum c_i},$$

where the summations are over the chromatographic slices, i, between the integration limits.

The branching index (g'vis or simply g') is defined as the ratio of the intrinsic viscosity of the branched polymer to the intrinsic viscosity of a linear polymer of equal molecular weight. The branching index g' is defined mathematically as:

$$g' = \frac{[\eta]_{avg}}{kM_v^\alpha}$$

where the Mv is the viscosity-average molecular weight based on molecular weights determined by LS analysis. The Mark-Houwink parameters k/α used in the reference linear polymer were 0.725/0.000291.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A catalyst for cyclic olefin polymerization, comprising a transition metal carbene having the following structure (V):

M$^v$ is a Group 5 transition metal having a valence, v, of 5 or a Group 6 transition metal having a valence (v) of 5 or 6;

OR' is 4-benzylphenolate or 4-(diphenylamino)phenolate;

each R' is independently a monovalent organic moiety comprising from 8 to 40 atoms selected from Groups 14-17;

c is an integer from 1 to 3;

m is 1/3, 1/2, 1, 3/2, 2, 3, or 4 and c*m≤v−2;

X is a halogen; and each R* is independently H or a $C_1$ to $C_7$ alkyl, wherein the catalyst comprises a ring opening metathesis reaction product of
- A) at least one metal alkoxide (I) having the formula: m$(R'O)_c M^u X_{(u-c)}$, and
- B) at least one transition metal halide (II) having the formula: $M'X_v$ to form a reaction product, wherein, $M^u$ is a Group 1, 2, or 13 metal of valence u, and the reaction product includes a ligand exchange involving the at least one metal alkoxide (I) that had been activated with a metal alkyl activator.

2. The catalyst according to claim 1, wherein v is 6, $M^v$ is tungsten (W), X is chlorine or fluorine, and each R' is an aromatic.

* * * * *